Oct. 10, 1961
E. SÄNGER
3,003,572
AIRCRAFT LAUNCHING VEHICLE
Filed Oct. 4, 1957
2 Sheets-Sheet 1
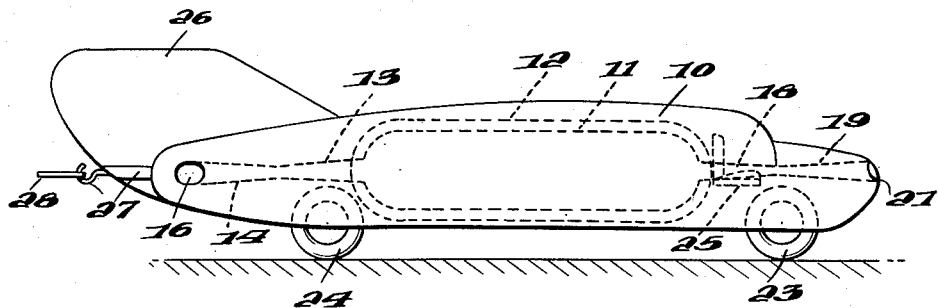
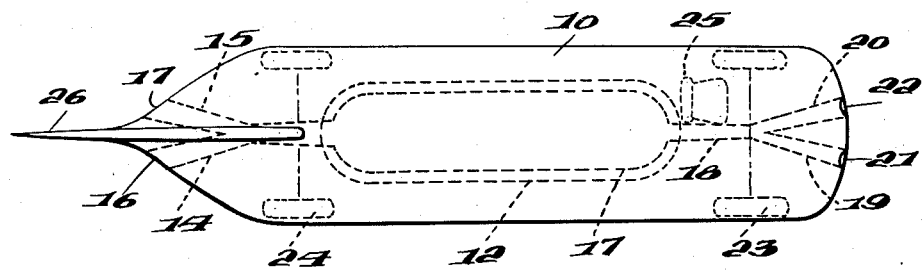
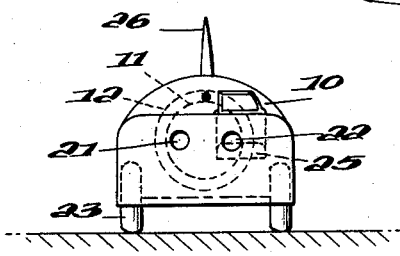
INVENTOR
EUGEN SÄNGER,
BY Lawson and Taylor
ATTORNEYS Oct. 10, 1961     E. SÄNGER     3,003,572
AIRCRAFT LAUNCHING VEHICLE
Filed Oct. 4, 1957     2 Sheets-Sheet 2
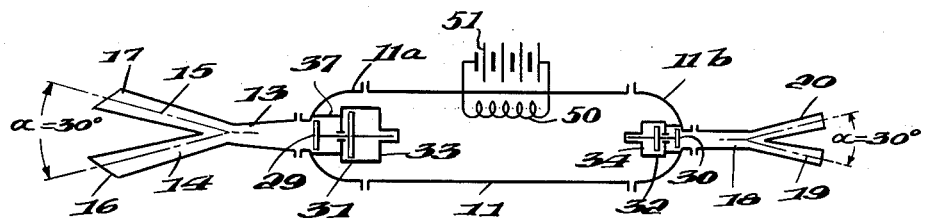
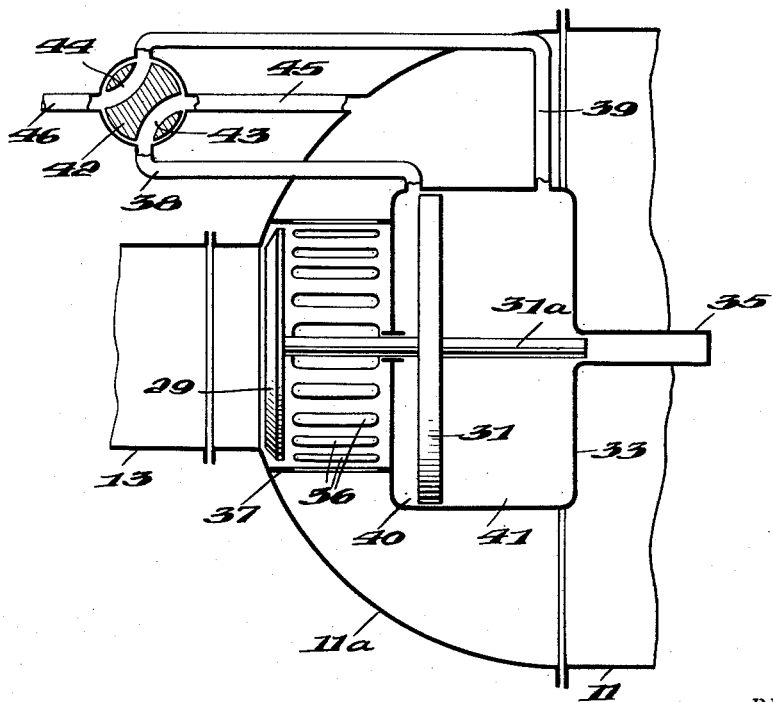
INVENTOR
EUGEN SÄNGER,
BY
ATTORNEYS

United States Patent Office 3,003,572
Patented Oct. 10, 1961

3,003,572
AIRCRAFT LAUNCHING VEHICLE
Eugen Sänger, Gerlingen-Schillerhohe, near
Stuttgart, Germany
Filed Oct. 4, 1957, Ser. No. 688,158
3 Claims. (Cl. 180—1)

This invention relates to an aircraft launching device and more particularly to a steam rocket carriage which will accelerate an aircraft to the take-off speed and which will remain grounded.

It is well known that light fighter aircraft having about six tons of take-off weight will have a take-off speed approaching 250 miles per hour and will require a runway length of between six thousand and ten thousand feet. However, many airfields are provided with runways of such length that it is not desirable to have a take-off distance exceeding two thousand feet. Thus, the necessity arises for an auxiliary means to assist in the take-off of the aircraft.

Heretofore solid propellant rockets built in to the aircraft have been used to assist in the take-off. However, the cost of such solid fuel rockets is extraordinarily high and it would be highly desirable to provide a less expensive means for accomplishing the same result.

According to the present invention there is provided a wheeled vehicle which has a steam producing means disposed therein comprising a tank containing hot water and means in the tank for generating steam from the hot water, and has blast pipes extending out both ends so that the vehicle is in effect a steam rocket. The vehicle is attached to the aircraft and accelerates the aircraft to its take-off speed. As soon as the aircraft is detached from the vehicle the direction of steam spray is reversed so as to brake the vehicle. Such a vehicle may be used repeatedly and due to its using merely hot water instead of the customary costly rocket propellants the cost per take-off can be considerably reduced. A runway of about fifteen hundred feet can be used for aircraft having a take-off speed of speeds approaching 250 miles per hour.

A primary object of the present invention is to provide a new and particularly economical device for launching aircraft on comparatively short runways.

Another object of the present invention is to provide a land vehicle propelled by means of a steam rocket which is adapted to be attached to an aircraft to accelerate the aircraft to its takeoff speed.

Still another object of the present invention is to provide an aircraft launching device comprising a vehicle which is adapted to be accelerated and braked by means of a steam rocket. The extraordinary operational economy of propulsion by hot water rocket permits the rocket carriage to be braked through a rocket counter-action, a process inapplicable with solid propellant rockets or liquid combustion rockets for economic reasons.

Other objects and many of the attendant advantages will be apparent upon consideration of the following detailed specification taken in connection with the accompanying drawings wherein:

FIG. 1 is a side elevation of a launching device constructed in accordance with the present invention;

FIG. 2 is a top plan view of the device shown in FIG. 1;

FIG. 3 is a front elevational view thereof;

FIG. 4 is a schematic view of the rocket propulsion means; and

FIG. 5 is a view partly in section of one of the operating valves.

The vehicle comprises a body portion 10 which surrounds a hot water tank 11 disposed lengthwise in the vehicle and having means 50 therein for generating steam. The outer surface of the hot water tank is provided with a heat insulated coating 12 in order to reduce energy losses. A pipe 13 extends rearwardly from the tank 11 and has two branches 14 and 15 as shown more clearly in FIG. 2. These pipes 14 and 15 are disposed at an angle of 30° with respect to one another and it will be seen that the pipe 13 decreases in diameter from the hot water tank to the point where pipes 14 and 15 branch off. Pipes 14 and 15 increase in diameter from the point where they join pipe 13 to the outer ends thereof. The exhaust ends of these pipes 16 and 17 are shaped to conform to the shape of the rear end of the body 10 and it can be seen that steam ejected from these pipes will have both a rearward and sideward component.

At the front end of the tank 11 there is provided a pipe 18 which is connected to angularly disposed forks 19 and 20. Pipes 18, 19 and 20 are smaller in diameter than pipes 13, 14 and 15 respectively and it can be seen that pipe 18 decreases in diameter from the hot water tank to the point where pipes 19 and 20 branch off. Pipes 19 and 20 increase in diameter from the point where they join pipe 18 to the exhaust ports 21 and 22 respectively.

The body 10 is provided with front wheels 23 and rear wheels 24 and a driver's seat 25. The front wheels 23 are provided with means for steering the vehicle in the manner of a customary motor vehicle and it is also possible, if found desirable, to provide means for steering the rear wheels 24. A rudder 26 extends vertically between the blast pipes 14 and 15 and serves to stabilize the vehicle. At the stern of the vehicle there is provided a device 27 to which is joined the towing equipment 28 of the aircraft to be towed.

Referring now to FIG. 4 it can be seen that the connection between pipe 13 and hot water tank 11 is controlled by valve 29 and the connection between pipe 18 and tank 11 is controlled by a similar but smaller valve 30. These valves are mounted on removable end sections 11a and 11b respectively of the hot water tank 11. Movement of the valve 29 is controlled by the piston 31 acting within cylinder 33 and movement of the valve 30 is controlled by piston 32 moving in cylinder 34.

In FIG. 5 the details of construction of the valve 29 are disclosed. It will be apparent that the construction of the valve 30 is substantially identical. Piston 31 is provided with a valve shaft 31a which has one end thereof connected with the valve 29 and the other end thereof reciprocates within an extension 35 of the cylinder 33. A cylindrical wall 37 surrounds the valve 29 and this wall has a plurality of slits 36 therein. Conduits 38 and 39 connect with chambers 40 and 41 respectively on opposite sides of the piston 31. A valve 42 having passageways 43 and 44 therein is adapted to connect the conduits 38 and 39 selectively with an exhaust port 46 connected to atmosphere and a conduit 45 leading to the pressure chamber 11.

It can be seen that with the valve 42 in the position shown the steam pressure within tank 11 will be applied through conduit 45 and 38 to the chamber 40. The chamber 41 will be connected through conduit 39 and 46 with the atmosphere so that the pressure applied to piston 31 will tend to move it to the right as viewed in FIG. 5 so as to open the valve 29. By shifting the position of the valve 42 the conduit 38 can be connected to atmosphere and the conduit 39 connected to the tank 11 through conduit 45 so that pressure will be applied to the opposite side of the piston to close valve 29. As pointed out hereinbefore, the valve 30 is similarly operated. Means may be provided for activating the valves separately or jointly. It is necessary, however, that opening of the valve 29 and closing of the valve 30 be separately controlled.

The device according to the present invention operates in the following manner: The tank 11 is filled with hot water. Steam is generated from the hot water. When the valve 29 is opened, the hot water begins to flow out of the nozzle 13, thereby partly evaporating. The resulting water steam mixture thus escapes at a high velocity, as if escaping from a steam boiler. This water steam jet yields the thrust force necessary to boost the launching carriage and to attain the desired take-off speed in the case of the aircraft mounted on the carriage, whereby the aircraft is separated from the carriage and moves away from the ground.

At this time valve 29 is closed. Acceleration of the carriage is thus terminated and the valve 30 is opened to permit the remaining steam hot water charge to issue through the nozzle 18, thus providing a counter force necessary to decelerate the carriage and bring it to a halt. The vehicle may be coupled to the aircraft in a number of different ways. It is possible to push the vehicle under the aircraft so that the aircraft runs on its own wheels. However, the usual small ground clearance in modern aircraft causes difficulties in accomplishing this. It is also difficult to guide the accelerating force so that it is through the gravity center of the combined aircraft and starting vehicle.

It might also be possible to lift the aircraft onto the top of the starting vehicle and have it carried thereby. However, it is exceedingly difficult to start the aircraft in this position. Furthermore, it would be necessary to couple the aircraft and vehicle together in a very precise manner and the structure for this coupling would become quite complicated.

It might also be possible to push the aircraft with the starting vehicle with the point of the application of force lying at the height of the center of gravity of the aircraft. Difficulty arises here, however, in that the blast pipe of the aircraft would be directed at the starting vehicle which would necessitate protecting devices on the vehicle.

It has been found preferable to tow the aircraft with the starting vehicle. This method has the advantages that the starter vehicle is completely self sufficient and independent of the type of aircraft to be started. It is possible to start light aircraft as well as heavy aircraft without substantial modification of the structure of the aircraft. The separation of the starting vehicle and the aircraft involves no particular problem in that the aircraft can simply drop the tow gear and can proceed in a normal fashion.

The aircraft is attached by means of the tow gear 27 and 28 and the valve 29 is open so that steam pressure escapes through passageways 14 and 15. These passageways are angularly disposed so that the escaping steam sprays do not hit the trailing aircraft nor injure it in any manner. The vehicle and aircraft are rapidly accelerated to the take-off speed of the aircraft and the aircraft releases the tow gear and overruns the starting vehicle in its climbing. As soon as the aircraft has released the tow gear the valve 29 is closed and the valve 30 opened so that the starting vehicle is braked to a stop.

The heating of the hot water tank can be accomplished by electrical devices such as the coil means shown at 50 with the battery 51. It is possible to load the tank from a special hot water procurer and utilize only a small electrical auxiliary heater of the nature of the coil means 50 for the purpose of maintaining the loading pressure.

It will be noted that the vehicle has a low center of gravity and is provided with rubber wheels in order to increase stability and give good ground cohesion.

Obviously, many modifications and variations of the present invention are possible in the light of the above teachings. What is claimed as new and desired to be secured by Letters Patent is:

1. In combination with the frame of a vehicle for accelerating an aircraft to take-off speed, said frame being supported on freely rotatable wheels, vehicle propulsion means independent of the wheels on the frame comprising a tank mounted on the wheeled frame and holding a fluid, means defining ducts extending rearwardly and forwardly of the vehicle from the tank and each terminating in a pair of vapor ejection nozzles disposed in divergent relationship about the longitudinal axis of the vehicle, means in the tank for generating pressure vapor from the fluid, and valve means in the tank controlling flow through the ducts for selectively releasing the pressurized vapor through one of the pairs of nozzles to accelerate and decelerate the vehicle.

2. The combination according to claim 1 wherein the fluid held by said tank is hot water and electrical means are disposed in the tank for generating steam from the hot water.

3. The combination according to claim 1 wherein the valve means comprises means defining a chamber, valve closure means including a piston mounted for reciprocal movement in the chamber, and means for passing fluid into the chamber to actuate the piston to move alternatively into valve open and valve closure positions.

References Cited in the file of this patent

UNITED STATES PATENTS

| 117,504 | Barbarin et al. | Aug. 1, 1871 |
| 789,334 | Orr | May 9, 1905 |
| 1,266,191 | Adsit | May 14, 1918 |
| 1,382,535 | Offen | June 21, 1921 |
| 2,242,628 | Taylor | May 20, 1941 |
| 2,366,892 | Donnellan | Jan. 9, 1945 |
| 2,526,510 | Smith | Oct. 17, 1950 |
| 2,567,954 | Liebmann | Sept. 18, 1951 |
| 2,591,376 | Rees | Apr. 1, 1952 |
| 2,717,744 | Birnbaum | Sept. 13, 1955 |

FOREIGN PATENTS

| 342,260 | Great Britain | Jan. 21, 1931 |
| 435,543 | Italy | Aug. 4, 1947 |